United States Patent [19]

Chu

[11] Patent Number: 4,980,429

[45] Date of Patent: Dec. 25, 1990

[54] LOW CURE AMINOPLAST CATHODIC ELECTRODEPOSITION BATHS

[75] Inventor: Edward Chu, King of Prussia, Pa.

[73] Assignee: E. I. Du Pont de Nemours and Company, Wilmington, Del.

[21] Appl. No.: 470,707

[22] Filed: Jan. 26, 1990

[51] Int. Cl.$^5$ .................. C25D 13/06; C08G 8/28; C08L 61/00

[52] U.S. Cl. ................... 525/511; 523/416; 204/181.7

[58] Field of Search .................. 204/181.7; 523/414–417, 404, 424; 525/510–511, 526, 532

[56] References Cited

U.S. PATENT DOCUMENTS

| | | | |
|---|---|---|---|
| 3,454,482 | 7/1969 | Spoor | 204/181.7 |
| 3,471,388 | 10/1969 | Koral | 204/181.7 |
| 3,839,252 | 10/1974 | Bosso | 524/512 |
| 3,937,679 | 2/1976 | Bosso | 204/181.7 |
| 4,046,729 | 9/1977 | Scriven | 204/181.7 |
| 4,066,525 | 1/1978 | Woo | 204/181.7 |
| 4,177,178 | 12/1979 | Das | 523/414 |
| 4,210,506 | 7/1980 | Hoppe | 204/181.7 |
| 4,277,383 | 7/1981 | Hayashi | 204/181.7 |
| 4,310,645 | 1/1982 | Kempter | 525/526 |
| 4,352,842 | 10/1982 | Kooymans | 427/385.5 |
| 4,363,710 | 12/1982 | Kempter | 204/181.7 |
| 4,385,097 | 5/1983 | Isozaki | 523/414 |
| 4,419,467 | 12/1983 | Wismer | 523/414 |
| 4,427,805 | 1/1984 | Kooijmans | 204/181.7 |
| 4,432,850 | 2/1984 | Moriarity | 204/181.7 |
| 4,468,307 | 8/1984 | Wismer | 204/181.7 |
| 4,495,327 | 1/1985 | Schenck | 204/181.7 |
| 4,501,833 | 2/1985 | Bosso | 523/416 |
| 4,524,161 | 6/1985 | Feuerhakn | 523/414 |
| 4,560,717 | 12/1985 | Christenson | 523/416 |
| 4,605,476 | 8/1986 | Hart | 204/181.6 |
| 4,610,769 | 9/1986 | Bosso | 204/181.7 |
| 4,617,331 | 10/1986 | Boberski | 204/181.7 |
| 4,640,753 | 2/1987 | Banks | 204/181.7 |
| 4,644,036 | 2/1987 | Waltz | 525/386 |
| 4,647,604 | 3/1987 | Kempter | 523/414 |
| 4,677,530 | 1/1987 | Mamiya | 361/414 |

*Primary Examiner*—John F. Niebling
*Assistant Examiner*—Ben C. Hsing
*Attorney, Agent, or Firm*—John M. Lynn

[57] ABSTRACT

A low cure cathodic electrodepositable resin is disclosed. The backbone of the resin is a polyepoxide amine adduct which is crosslinked with aminoplast resins and catalyzed by metal catalysts. The resin is capable of curing in a basic environment at a temperature below 150° C. The resin can be salted with an acid and can be dissolved or dispersed in water. The aqueous dispersions can then be formulated into electrocoat primer coatings for metal objects.

13 Claims, No Drawings

LOW CURE AMINOPLAST CATHODIC ELECTRODEPOSITION BATHS

CROSS REFERENCE TO RELATED APPLICATION

This application is a continuation-in-part of co-pending application Ser. No. 07/301,472 filed Jan. 26, 1989 now abandoned.

TECHNICAL FIELD

The field of art to which this invention pertains is electrodepositable compositions containing aminoplast resins with metal catalysts to be used in cathodic electrocoat processes.

BACKGROUND ART

The coating of electrically conductive substrates by electrodeposition is a well known and important industrial process. (For instance, electrodeposition is widely used in the automotive industry to apply primers to automotive substrates). In this process, a conductive article is immersed as one electrode in a coating composition made from an aqueous emulsion of film-forming polymer. An electric current is passed between the article and a counter-electrode in electrical contact with the aqueous emulsion, until a desired coating is produced on the article. Early electrodeposition was conducted with the article to be coated serving as the anode. This was familiarly referred to as anodic electrodeposition. Currently, the article to be coated typically serves as the cathode in the electrical circuit with the counter-electrode being the anode. This is known as cathodic electrodeposition.

Resin compositions used in cathodic electrodeposition baths are also well known in the art. These resins are usually manufactured from polyepoxide resins which have been chain extended and adducted to include a nitrogen atom. The nitrogen is typically introduced through reaction with an amine compound. Normally these resins are blended with a crosslinking agent and then salted with an acid to form a water emulsion which is usually referred to as a principal emulsion.

The principal emulsion is combined with a pigment paste, coalescent solvents, water, and other additives to form the electrodeposition bath. The electrodeposition bath is placed in an insulated tank containing the anode. The article to be coated is made the cathode and is passed through the tank containing the electrodeposition bath. The thickness of the coating is a function of the bath characteristics, the electrical operating characteristics, the immersion time, and so forth.

The coated object is removed from the bath after a fixed period of time (normally about two or three minutes). The object is rinsed with deionized water and the coating is cured, typically in an oven at sufficient temperature to produce crosslinking.

The first cathodic electrodepositable compositions used amine salt group-containing resins or onium salt group-containing resins as the binder, see, for example, U.S. Pat. No. 3,454,482 to Spoor et al and U.S. Pat. No. 3,839,252 to Bosso and Wismer. The curing agents for these resins were usually aminoplasts since these curing agents were used quite successfully with the earlier anodic electrodepositable resins. However, it was initially found that the aminoplasts were not completely satisfactory for use in cathodic electrodeposition. Aminoplasts cure best in an acidic environment. With anodic electrodeposition, this poses no problem since the anodically electrodeposited coating is acidic. However, the cathodically electrodeposited coating is basic and relatively high temperatures, that is, about 400° F. (204° C.) or higher must be used for complete curing of the cathodically electrodeposited coating.

Attempts have been made to overcome this problem by utilizing an acid-functional aminoplast as crosslinker with the hydroxyl containing amino epoxy resin (U.S. Pat. No. 4,066,525). However, this approach has not been found to be satisfactory because a high cure temperature of over 175° C. is required. Other approaches include using quaternary onium salt-containing resins in combination with an aminoplast or a methylol-phenol ether (U.S. Pat. No. 3,937,679) disclosing 400° F. cure temperature. U.S. Pat. No. 4,501,833 also discloses quaternary onium salt containing resins in combination with high imino functional aminoplasts. While the '833 patent discloses relatively low cure temperature, we have found performance is not satisfactory because the coated film is rough and too thin.

Another approach is disclosed in U.S. Pat. No. 4,363,710 utilizing a resin with primary amino functionality and a melamine/formaldehyde crosslinker, catalyzed with a phenolic blocked phosphoric acid ester. However this system shows only very high temperature cure (180° C. or above for 20 minutes).

There is a need for a cathodic electrodeposition process using aminoplasts which will give a good smooth coating and yet cure at low temperatures in a basic environment. We have found that an aminoplast system will cure at low temperatures (100° C. to 150° C.) in a basic environment (i.e. cathodic system) if catalyzed by metal catalysts. The metal catalysts are metal salts of both organic acid salts or inorganic acid salts such as Cu, Fe, Mn, Co, Pb, Bi, Zn and Sn octoate and naphthanate. As stated above, this result is very surprising, as it was previously thought that aminoplast resins would only cure in an acid environment at these relatively low temperatures.

Metal catalysts are known in the art to catalyze certain coating compositions but metal catalysts are not known to cure aminoplasts. Prior art references teach the use of metal catalysts for the following: alkyd oxidative cure (U.S. Pat. No. 4,495,327); in an electrocoat system for transesterification (U.S. Pat. No. 4,352,842 and U.S. Pat. No. 4,644,036); and in electrocoat systems for amidation (U.S. Pat. No. 4,477,530). There is nothing in the prior art to suggest their use to catalyze the reaction of aminoplast resins.

The novel resin of this invention is not restricted to cathodic electrodeposition. It also could be used in non-electrocoat applications such as spray applications, roller coating, dip applications, and so forth.

SUMMARY OF THE INVENTION

In accordance with the present invention, a novel, improved cathodic electrodeposition coating composition is disclosed using aminoplast resins. More specifically, our coating composition comprises a typical polyepoxy resin with primary or secondary amino functionality crosslinked with aminoplasts (melamine/formaldehyde or urea-formaldehyde crosslinker) and catalyzed by metal catalysts. The novel composition provides a smooth coating with good top coat adhesion and corrosion resistance which will cure at 100° C. to 150° C.

DETAILED DESCRIPTION

The amino functional backbone resin which is used in the practice of this invention is typically obtained by reacting polyepoxide resins with nitrogen containing compounds such that the resin becomes amino functional. The resin should contain either primary or secondary amino functionality and most preferably primary amino functionality. The polyepoxide resins which are used to make the amino functional resins are well known in the art.

The polyepoxide resins which are used in the practice of the invention are polymers having a 1,2-epoxy equivalency greater than one and preferably about two, that is, polyepoxides which have on an average basis two epoxy groups per molecule. The preferred polyepoxides are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are
2,2-bis-(4-hydroxy-3-tertiarybutylphenyl)propane,
1,1-bis-(4-hydroxyphenyl)ethane.
2-methyl-1,1-bis-(4-hydroxyphenyl) propane.
2,2-bis-(4-hydroxy-3-tertiarybutylphenyl)propane.
bis-(2-hydroxynaphthyl) methane.
1,5-dihydroxy-3-naphthalene or the like.

Besides polyhydric phenols, other cyclic polyols can be used in preparing the polyglycidyl ethers of cyclic polyol derivatives. Examples of other cyclic polyols would be alicyclic polyols, particularly cycloaliphatic polyols, such as
1,2-cyclohexanediol, 1,4-cyclohexanediol,
1,2-bis(hydroxymethyl)cyclohexane,
1,3-bis-(hydroxymethyl)cyclohexane and hydrogenated bisphenol A.

The polyepoxides have number average molecular weights (Mn) of at least 200 and preferably within the range of 200 to 2000, and more preferably about 340 to 2000.

The polyepoxides are preferably chain extended with a polyether or a polyester polyol which increases rupture voltage of the composition and enhances flow and coalescence. Examples of polyether polyols and conditions for chain extension are disclosed in U.S. Pat. No. 4,468,307, column 2, line 67, to column 4, line 52, the portions of which are hereby incorporated by reference. Examples of polyester polyols for chain extension are disclosed in U.S. Pat. No. 4,148,772, column 4, line 42, to column 5, lines 53, the portions of which are hereby incorporated by reference.

In addition to the polyepoxide backbone resin, this invention would also be applicable to acrylic, polybutadiene, polyester or phenolic resins which contain amino functionality.

The backbone resin is given its amino functionality by reacting it with nitrogen containing materials. More specifically, the primary amino functionality can be imparted by the ketimine approach as shown by U.S. Pat. No. 4,104,147 or the ammoniation approach as shown by U.S. Pat. No. 4,310,645. Preferably the amino functionality on the backbone resin is primary amino or secondary amino functionality. Most preferably the amino functionality is primary. The ketimine approach appears to be the most preferred method of imparting the amino functionality.

The crosslinkers in this invention are aminoplast resins. The aminoplast resins must have either a high imino content or a high methylol content (or a mixture thereof) and also a low water solubility. The sum of the imino functional groups and methylol functional groups must be at least 20 percent and preferably 30 percent of the total available functional sites on the aminoplast resin. A commmercial example of such an aminoplast resin is Cymel 1158 ®.

Furthermore an aminoplast resin that is to be used in electrodeposition must be substantially water insoluble in order to ensure codeposition with the electrocoat backbone resin. At least 50 percent or more and preferably 75 percent or more of the aminoplast resin must partition into the discrete phase (the discrete phase contains the back-bone resin, pigments, heavy metal catalyst and additives). The aminoplast resin must be at least about as water insoluble as Cymel 1158 ®.

Melamine-formaldehyde resins having either a high imino content or a high methylol content (or a mixture thereof) and also a low water solubility are commercially from the Monsanto Company under the trademark Resimene ® and from American Cyanamid under the trademark Cymel ®. Our preferred aminoplast is one which contains high imino groups such as Cymel ® 1158. It is also possible to use partially alkylated resins containing methyol groups. Less preferred are highly alkylated aminoplasts such as Cymel ® 300 and Cymel ® 1160. In addition, carboxyl modified amino resins such as the Cymel ® 1100 resins (specifically Cymel ® 1141 and Cymel ® 1125) could be utilized in the invention. These carboxyl modified amino resins must also be substantially water insoluble and have the imino content and/or methylol content described above for other aminoplast resins.

Another type of aminoplast resin which can be used as the crosslinker are urea-formaldehyde resins. These resins are commercially available from American Cynamide Co. under the tradename Beetle ®. These resins are also chosen according to the imino content and/or methylol content. The preferred urea-formaldehyde resins are ones which contains methylol groups such as Beetle ® 55, 60, or 65. Less preferred are urea-formaldehyde resins which are highly alkylated such as Beetle ® 80.

The metal catalysts of our invention are metal salts of both organic acids or inorganic acids, or coordination compounds of these metals. Organic acid salts are more desirable, particularly organic acid salts that are compatible with the resin compositions and that are water insoluble. These usually are metallic soaps of monocarboxylic acids containing 7 to 22 carbon atoms.

The metals used in the catalyst are iron, lead, lithium, potassium, sodium, calcium, magnesium, beryllium, aluminum, zinc, cadmium, barium, scandium, gallium, indium, tin, vanadium, manganese, molybdenum, tellurium, silver, copper, nickel, cobalt, chromium, palladium and so forth.

Our preferred catalysts are Co, Cu, Fe and Pb octoates or napthenates. These catalysts are commercially available from Huls American Inc. under the tradenames Nuodex ® or Nuxtra ®. We have found that especially preferred catalysts are chelates of the metals such as coordination compounds or complexes of the metal with Lewis bases or ligands. Our most preferred catalyst is cobalt acetyl acetonate.

The amine functional resin and the aminoplast crosslinker are the principal resinous ingredients in the electrocoating composition. They are usually present in a ratio of backbone resin to crosslinker of about 40/60 to 95/5 percent by weight of solids. Preferably, the ratio is 85/15 to 65/35 backbone resin to crosslinker. The metal catalyst is typically present in amounts of about 0.1 to 5.0 percent by weight of total resin solids. Preferably, the metal catalyst is present from 0.5 to 1.5 percent by weight of total resin solids.

Besides the resinous ingredients described above, the electrocoating compositions usually contain a pigment which is incorporated into the composition in the form of a paste. The pigment paste is prepared by grinding or dispersing a pigment into a grinding vehicle and optional ingredients such as wetting agents, surfactants and defoamers. Pigment grinding vehicles are well known in the art. After grinding, the particle size of the pigment should be as small as practical, generally a Hegman grinding gauge of about 6 to 8 is usually employed.

Pigments which can be employed in the practice of the invention include titanium dioxide, basic lead silicate, strontium chromate, carbon black, iron oxide, clay and so forth. Pigments with high surface areas and oil absorbencies should be used judiciously because they can have an undesirable effect on coalescence and flow.

The pigment-to-resin weight ratio is also fairly important and should be preferably less than 0.5:1, more preferably less than 0.4:1, and usually about 0.2 to 0.4:1. Higher pigment-to-resin solids weight ratios have also been found to adversely affect coalescence and flow.

The coating composition of the invention can contain optional ingredients such as plasticizers, wetting agents, surfactants, defoamers and so forth. Examples of surfactants and wetting agents include alkyl imidazolines such as those available from Ciba-Geigy Industrial Chemicals as "Amine C", and from Air Products as "Surfynol 104". These optional ingredients, when present, constitute from about 0 to 20 percent by weight of total resin solids. Plasticizers are preferred optional ingredients because they promote flow. Examples are high boiling water immiscible materials such as ethylene or propylene oxide adducts of nonyl phenols or bisphenol A. When plasticizers are used, they are used in amounts of about 0.5 to 10.0 percent by weight of total resin solids.

The electrodepositable coating compositions of the present invention are dispersed in aqueous medium. The term "dispersion" as used within the context of the present invention is believed to be a two-phase translucent or opaque aqueous resinous system in which the resin is in the dispersed phase and water the continuous phase. The average particle size diameter of the resinous phase is about 0.1 to 5.0 microns, preferably less than 1 micron. The concentration of the resinous products in the aqueous medium is, in general, not critical, but ordinarily the major portion of the aqueous dispersion is water. The aqueous dispersion usually contains from about 3 to 75, typically 5 to 50 percent by weight of total resin solids. Aqueous resin concentrates which are to be further diluted with water at the job site generally range from 30 to 75 percent by weight of total resin solids. Fully diluted electrodeposition baths generally have resin solids content of about 3 to 25 percent by weight of total resin solids.

Besides water, the aqueous medium may also contain a coalescing solvent. Useful coalescing solvents include hydrocarbons, alcohols, esters, ethers and ketones. The preferred coalescing solvents include alcohols, polyols and ketones. Specific coalescing solvents include butanol, 2-ethylhexanol, 4-methoxy-2-pentanone, ethylene and propylene glycol and the monoethyl, monobutyl, monohexyl and 2-ethylhexyl ethers of ethylene glycol. The amount of coalescing solvent is not unduly critical and is generally between about 0 to 15 percent by weight, preferably about 0.5 to 5 percent by weight based on total weight of the aqueous medium.

EXAMPLES

Example I

Preparation of Amine Containing Resin (A) Preparation of Monoketimine 416.0 grams (4 gm-moles) of 2-(2-aminoethylamine) ethanol and 800.0 grams (8 gm-moles) of methylisobutylketone were charged to a 2-liter, three-neck reaction flask equipped with agitator, condenser, water separator, thermometer and heating mantle. The mixture was heated and held at reflux (initial reflux temperature was at 110° C.) and water (by-product) was azeotropically removed. When 74.0 grams of water was removed, 214 grams of methyisobutylketone was stripped off and the batch was cooled to 50° C. under a dry $N_2$ gas blanket and was packaged to be used in part (B). This product has a total amine equivalent of about 128.9 at 72.0 percent solids with amine functionality of two.

(B) Preparation of Primary Amine Containing Resin

A primary amine containing resin was prepared from the following ingredients:

| Ingredients | Solids in Grams | Equivalents | Grams |
|---|---|---|---|
| "Synfac 8105"[1] | 299.8 | 0.92 | 299.8 |
| Bisphenol A | 264.2 | 2.32 | 264.2 |
| Methyisobutylketone (MIBK) (first portion) | — | | 11.4 |
| Diethanolamine | 5.6 | 0.05 | 5.6 |
| "DER-361"[2] | 520.7 | 2.67 | 520.7 |
| Diethanolamine | 5.2 | 0.05 | 5.2 |
| Hexyl "Cellosolve" | | | 34.6 |
| Butyl "Cellosolve" | | | 39.5 |
| MIBK (second portion) | | | 200.7 |
| Monoketimine (prepared above) | 197.2 | 2.12 | 273.9 |
| Deionized Water | | | 30.0 |
| MIBK (third portion) | | | 361.0 |
| TOTAL | | | 2046.6 |

[1] Polyether epoxy from Milliken Chemical Co. formed from reacting bisphenol A with propylene oxide and epichlorohydrin having epoxy equivalent of 325.
[2] Epoxy resin from Dow Chemical Co. formed from reacting epichlorohydrin and bisphenol A having epoxy equivalent of 195.

The "Synfac 8105", bisphenol A, MIBK (first portion) and diethanol amine were charged to a reaction vessel and heated with a nitrogen purge to 130° C. After an exotherm, the batch was held at 150° C. for about two hours until the milliequivalent of combined amine and epoxy per gram solution was equal or less than 0.2. The batch was cooled to 120° C. and then the "DER-361" and diethanol amine were added and the batch was held at 120° C. for about one and one-half hours until the milliequivalent of the combined amine and epoxy per gram solution was between 1.21 to 1.17. The batch was then diluted with hexyl "cellosolve", butyl "cellosolve" and MIBK (second portion) and cooled to 70° C. The monoketimine was added and held at 70° C. for one hour. Then the batch temperature was raised to 120° C. and held for two hours followed by cooling to 90° C. After the addition of deionized water and the MIBK solvent (third portion), the batch was cooled to 50° C. and packaged.

TABLE 1 (below) shows the formulation of the amino epoxy resin using various aminoplasts with or without metal catalysts incorporated.

TABLE 2 (below) shows the solvent resistance of the draw down film from the formulations from TABLE 1 on cold roll steel and zinc phosphatized steel substrates at various bake temperatures. (A coating of film which withstands 100 MEK double rubs is considered cured). In all cases the formulations that contain metal catalysts cure much better than those without the metal catalyst. The cure temperature is significantly lower.

As the melamine-formaldehyde resins are replaced with urea/formaldehyde resins, e.g., Beetle ® 60 or Beetle ® 65 of American Cyanamid, the cure temperature in all cases has also been significantly reduced when an appropriate metal catalyst is utilized versus the same system without a metal catalyst. The cure film of either system above has also exhibited good solvent resistance and good adhesion to metal.

Formulation No.2 from Table I can be made into a cathodic dispersion as follows:

| Ingredient | Solids | Grams |
|---|---|---|
| Amino Epoxy resin of Ex. I-B | 141.4 | 235.6 |
| Cymel ® 1158 | 48.2 | 60.3 |
| Synfac 8029 ® (1) | 0.9 | 0.9 |
| Lead Octoate/24% Lead (Nuodex ® 24% Lead) | 5.5 | 8.5 |
| Formic Acid/90% | | 5.3 |
| Deionized Water | | 690.3 |
| Total | | 1,000.9 |

(1)Propoxylated Bisphenol A from Milliken Chemical Co. formed by Reacting one mole of bisphenol A with two moles of propylene oxide.

The amino epoxy resin, Cymel ® 1158, Synfac 8029 ®, lead octoate and formic acid were premixed in a container equipped with an agitator for one-half hour. Then the deionized water was very slowly introduced with good agitation until the mixture was inverted or emulsified to aqueous dispersion. The initial pH was about 7.5 with a conductivity of about 2.8 micro-mHOs per cm.

After the above cathodic dispersion was agitated in an open can overnight, several cold roll steel and zinc phosphatized metal panels were cathodically electrocoated in the dispersion and then the panels were baked in an oven at various temperatures for 30 minutes. It has been found that the coated film of about 0.6 to 1.2 mil did cure at 120° C. The cured film did not soften after 100 MEK double rubs. It has good wet adhesion to metal and good corrosion resistance with a creepage of 1 mm after 1000 hours salt spray exposure.

TABLE I

Formulations of Amino Epoxy Resin Using Various Aminoplasts and Metal Catalysts

| Formulation No. | Parts by Wt. Amino Epoxy Resin Ex I-B (at 65% Solids) | Parts by Weight - Aminoplast | | | Parts by Weight - Metal Catalyst | | | |
|---|---|---|---|---|---|---|---|---|
| | | Cymel ® 1158* 80% Solids | Cymel ® 373+ 85% Solids | Cymel ® 303# 98% Solids | Nuodex ® Lead Octoate (24% Pb) | Nuxtra ®Δ Synthetic Drier (12% Cobalt) | Nuodex ® Copper Octoate (8% Copper) | Nuxtra ®Δ 12% Iron |
| 1 | 25.0 | 6.4 | | | No Catalyst | | | |
| 2 | 25.0 | 6.4 | | | 0.9 | | | |
| 3 | 25.0 | 6.4 | | | | 1.8 | | |
| 4 | 25.0 | 6.4 | | | | | 2.7 | |
| 5 | 25.0 | 6.4 | | | | | | 1.8 |
| 6 | 25.0 | | 6.0 | | — | — | | |
| 7 | 25.0 | | 6.0 | | 0.9 | | | |
| 8 | 25.0 | | 6.0 | | | 1.8 | | |
| 9 | 25.0 | | 6.0 | | | | 2.7 | |
| 10 | 25.0 | | 6.0 | | | | | 1.8 |
| 11 | 25.0 | | | 5.2 | — | — | | |
| 12 | 25.0 | | | 5.2 | 0.9 | | | |
| 13 | 25.0 | | | 5.2 | | 1.8 | | |
| 14 | 25.0 | | | 5.2 | | | 2.7 | |
| 15 | 25.0 | | | 5.2 | | | | 1.8 |

*Trademark of American Cyanamid Co. for their butylated, high imino (—NH) melamine-formaldehyde resin
+Trademark of American Cyanamid Co. for one of their partially methylated melamine-formaldehyde resins
Trademark of American Cyanamid Co. for one of their highly methylated melamine-formaldehyde resins
ΔTrademarks of Huls America Inc. for their line of metal driers or soaps based on naphthenates, octoates, and synthetic esters

TABLE 2

SOLVENT RESISTANCE* OF VARIOUS COATINGS BAKED AT VARIOUS TEMPERATURES FOR 30 MINUTES

| Formulation No. | Substrate Zinc Phosphatized | Cold Roll Steel | ** Application Draw Down | No. of MEK Double Rubs at Various Bake Temperature - °F. | | | | |
|---|---|---|---|---|---|---|---|---|
| | | | | 225 | 250 | 300 | 350 | 400 |
| 1 | Yes | | Yes | | | | 83 | 100 | >100 |
| 1 | | Yes | yes | | | 52 | 100 | >100 |
| 2 | Yes | | Yes | 100 | 100 | >100 | | |
| 2 | | Yes | Yes | 100 | >100 | >100 | | |
| 3 | Yes | | Yes | >100 | >100 | >100 | | |
| 3 | | Yes | Yes | >100 | >100 | >100 | | |
| 4 | Yes | | Yes | >100 | >100 | >100 | | |
| 4 | | Yes | Yes | >100 | >100 | >100 | | |
| 5 | Yes | | Yes | >100 | >100 | >100 | | |
| 5 | | Yes | Yes | >100 | >100 | >100 | | |
| 6 | Yes | | Yes | | | 100 | >100 | >100 |

TABLE 2-continued
SOLVENT RESISTANCE* OF VARIOUS COATINGS BAKED AT VARIOUS TEMPERATURES FOR 30 MINUTES

| Formulation No. | Substrate Zinc Phosphatized | Cold Roll Steel | ** Application Draw Down | No. of MEK Double Rubs at Various Bake Temperature - °F. | | | | |
|---|---|---|---|---|---|---|---|---|
| | | | | 225 | 250 | 300 | 350 | 400 |
| 6 | | Yes | Yes | | | 100 | >100 | >100 |
| 7 | Yes | | Yes | >100 | >100 | >100 | | |
| 7 | | Yes | Yes | >100 | >100 | >100 | | |
| 8 | Yes | | Yes | >100 | >100 | >100 | | |
| 8 | | Yes | Yes | >100 | >100 | >100 | | |
| 9 | Yes | | Yes | >100 | >100 | >100 | | |
| 9 | | Yes | Yes | >100 | >100 | >100 | | |
| 10 | Yes | | Yes | >100 | >100 | >100 | | |
| 10 | | Yes | Yes | >100 | >100 | >100 | | |
| 11 | Yes | | Yes | | | 30 | 100 | >100 |
| 11 | | Yes | Yes | | | 26 | 100 | 100 |
| 12 | Yes | | Yes | | | 80 | >100 | >100 |
| 12 | | Yes | Yes | | | 72 | >100 | >100 |
| 13 | Yes | | Yes | | | 30 | >100 | >100 |
| 13 | | Yes | Yes | | | 100 | >100 | >100 |
| 14 | Yes | | Yes | | | 45 | 100 | >100 |
| 14 | | Yes | Yes | | | 80 | >100 | >100 |
| 15 | Yes | | Yes | | | >100 | >100 | >100 |
| 15 | | Yes | Yes | | | >100 | >100 | >100 |

*Solvent resistance of cured or baked film is defined as the film remains intact after MEK solvent rubs.
** Drawdown film using 2.4 mil doctor blade using solution formulation at about 40% solids which gives a cure film thickness of approximately 1.0 mil.

I claim:

1. A cathodic electrodepositable resin comprising:
   (a) a backbone resin which is a polyepoxide amine adduct;
   (b) a melamine-formaldehyde crosslinker; the melamine-formaldehyde being substantially water insoluble and having either imino functional groups or methylol functional groups or a mixture thereof, wherein the sum of the imino functional groups and methylol functional groups must be at least 20 percent of the total available functional sites on the melamine-formaldehyde;
   (c) a metal catalyst which is incorporated to catalyze a reaction between the backbone resin and the melamine formaldehyde; and
   wherein the ratio of the backbone resin to the crosslinker is 40/60 to 95/5 by weight of total resin solids, the metal catalyst is present in amounts of about 0.5 to 5.0 percent by weight of total resin solids, and the electrodepositable resin is capable of curing in a basic environment at a temperature below 150° C.

2. The cathodic electrodepositable resin of claim 1, wherein the metal catalyst is a metal salt of organic acids or inorganic acids.

3. The cathodic electrodepositable resin of claim 2 wherein the metal forms a coordination compound or complex with a Lewis base or ligand.

4. The cathodic electrodepositable resin of claim 2 wherein the metal catalyst is a metallic soap of monocarboxylic acids containing 7 to 22 carbon atoms.

5. The cathodic electrodepositable resin of claim 4 wherein the metal catalyst contains metals selected from the group consisting of Cobalt, Copper, Iron, and Lead.

6. The electrodepositable resin of claim 1 wherein the polyepoxide amine adduct is a polyglycidlyl ether of polyhydric phenol with primary amino or secondary amino functionality.

7. A cathodic electrodepositable resin comprising:
   (a) a backbone resin which is a polyepoxide amine adduct;
   (b) a urea-formaldehyde crosslinker; the urea-formaldehyde being substantially water insoluble and having either imino functional groups or methylol functional groups or a mixture thereof, wherein the sum of the imino functional groups and methylol functional groups must be at least 20 percent of the total available functional sites on the urea-formaldehyde; and
   (c) a metal catalyst which is incorporated to catalyze a reaction between the backbone resin and the urea-formaldehyde;
   wherein the ratio of the backbone resin to the crosslinker is b 40/60 to 95/5 by weight of total resin solids, the metal catalyst is present in amounts of about 0.5 to 5.0 percent by weight of total resin solids, and the electrodepositable resin is capable of curing in a basic environment at a temperature below 150° C.

8. The cathodic electrodepositable resin of claim 7, wherein the metal catalyst is a metal salt of organic acids or inorganic acids.

9. The cathodic electrodepositable resin of claim 8 wherein the metal forms a coordination compound or complex with a Lewis base or ligand.

10. The cathodic electrodepositable resin of claim 8 wherein the metal catalyst is a metallic soap of monocarboxylic acids containing 7 to 22 carbon atoms.

11. The cathodic electrodepositable resin of claim 10 wherein the metal catalyst contains metals selected from the group consisting of Cobalt, Copper, Iron, and Lead.

12. The cathodic electrodepositable resin of claim 7 wherein the polyepoxide amine adduct is a polyglycidlyl ether of polyhydric phenol with primary amino or secondary amino functionality.

13. A cathodic electrodepositable resin comprising:
   (a) a backbone resin which is a polyepoxide amine adduct;
   (b) a carboxyl modified aminoplast crosslinker; the carboxyl modified aminoplast being substantially water insoluble and having either imino functional groups or methylol functional groups or a mixture thereof, wherein the sum of the imino functional groups and methylol functional groups must be at least 20 percent of the total available functional sites on the carboxyl modified aminoplast; and
(c) a metal catalyst which is incorporated to catalyze a reaction between the backbone resin and the carboxyl modified aminoplast;
(d) wherein the ratio of the backbone resin to the crosslinker is 40/60 to 95/5 by weight of total resin solids, the metal catalyst is present in amounts of about 0.5 to 5.0 percent by weight of total resin solids, and the electrodepositable resin is capable of curing in a basic environment at a temperature below 150° C.

* * * * *